United States Patent [19]

Topfl

[11] 4,371,637

[45] Feb. 1, 1983

[54] MIXTURES OF REACTION PRODUCTS BASED ON EPOXIDES, PRIMARY AMINES AND FATTY ACIDS AND OF AMINOPLAST PRECONDENSATES, THEIR PREPARATION AND THEIR USE AS LEATHER DRESSINGS

[75] Inventor: Rosemarie Topfl, Dornach, Switzerland

[73] Assignee: Ciba-Geigy Corporation, Ardsley, N.Y.

[21] Appl. No.: 279,508

[22] Filed: Jul. 2, 1981

[30] Foreign Application Priority Data

Jul. 11, 1980 [CH] Switzerland .......................... 5350/80

[51] Int. Cl.[3] .......................... C08G 8/32; C08G 59/00; C08L 61/26; C08L 63/02

[52] U.S. Cl. .................................... 523/416; 8/94.1 P; 8/94.1 R; 8/94.24; 8/436; 252/8.57; 427/386; 428/413; 428/473; 524/538; 525/514

[58] Field of Search ................ 260/21, 18 EP, 29.4 R; 427/386; 8/94.1 P, 94.1 R, 94.24, 436; 252/8.57; 523/416; 524/538, 514; 428/413, 473

[56] References Cited

U.S. PATENT DOCUMENTS

| | | | |
|---|---|---|---|
| 3,716,402 | 2/1973 | Hicks | 427/386 |
| 3,843,391 | 10/1974 | Töepfl et al. | 8/94.1 R |
| 3,951,891 | 4/1976 | Töpfl et al. | 427/386 |
| 4,054,716 | 10/1976 | Töpfl | 428/413 |
| 4,134,867 | 1/1979 | Töpfl | 8/94.1 R |
| 4,225,478 | 9/1980 | Hicks | 260/21 |
| 4,302,373 | 11/1981 | Steinmetz | 260/29.4 R |

*Primary Examiner*—Ronald W. Griffin

*Attorney, Agent, or Firm*—Edward McC. Roberts

[57] ABSTRACT

Mixtures of (1) reaction products obtained from (a) epoxides, for example polyglycidyl ethers of bisphenol A, (b) primary amines having 2 to 8 carbon atoms and (c) polymerized fatty acids, for example dimerized or trimerized linoleic acids and linolenic acids, and optionally (d) difunctional compounds, for example epichlorohydrin, acrylic acid or acrylonitrile, and (2) aminoplast precondensates, for example methylolated and lower alkyl-etherified melamine or urea, are useful as leather finishes and are preferably employed in the form of organic-aqueous emulsions.

27 Claims, No Drawings

MIXTURES OF REACTION PRODUCTS BASED ON EPOXIDES, PRIMARY AMINES AND FATTY ACIDS AND OF AMINOPLAST PRECONDENSATES, THEIR PREPARATION AND THEIR USE AS LEATHER DRESSINGS

The present invention relates to mixtures of reaction products (1) and aminoplast precondensates (2), which mixtures contain (1) reaction products obtained from the following reactants: (a) an epoxide having at least two epoxy groups per molecule, (b) a primary amine having 2 to 8 carbon atoms and (c) a polymerised fatty acid which is derived from monomeric, unsaturated fatty acids having 16 to 22 carbon atoms, and optionally (d) a difunctional compound which differs from the reactants (a) and (c), and (2) as the second component of the mixture, an aminoplast precondensate etherified by alkyl having 1 to 6 carbon atoms.

The invention further relates to the preparation of the mixtures of the stated type, to their use as leather dressings, to a process for applying the mixtures according to the invention for the purpose of dressing leather, the aqueous-organic preparation which contains the mixtures according to the invention and is used in the process of application to leather, and the leather dressed by the said process.

The epoxides which constitute reactant (a) of the reaction product (1) are preferably derived from polyvalent phenols or polyphenols, such as resorcinol or phenol-formaldehyde condensates of the resol or novolac type. In particular, bisphenols, such as bis-(4-hydroxyphenyl)-methane and especially 2,2-bis-(4'-hydroxyphenyl)-propane, also referred to as bisphenol A, are preferred as starting compounds for the preparation of the epoxides. Compounds to be mentioned particularly are polyglycidyl ethers, preferably diglycidyl ethers, of 2,2-bis-(4'-hydroxyphenyl)-propane, especially those which have an epoxide content of 0.3 to 2.2 epoxy group equivalents/kg and which correspond, for example, to the formula

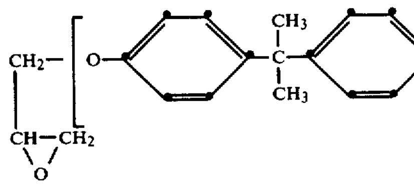
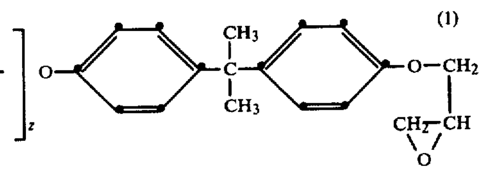

(1)

in which z is an average number, preferably having a value from 2 to 18, especially from 5 to 12. Such epoxides are in general obtained by reacting epichlorohydrin with 2,2-bis-(4'-hydroxyphenyl)-propane.

Suitable primary amines of 2 to 8 carbon atoms, to be used as reactant (b), are aromatic amines, and aliphatic amines which may or may not be ethylenically unsaturated. Saturated amines, particularly cycloalkylamines and more especially alkylamines, are preferred. Specific examples of the amines are aniline, benzylamine, allylamine and particularly cyclohexylamine, and especially methylamine, ethylamine, isopropylamine, butylamine, amylamine, hexylamine, heptylamine and ethylhexylamine. Cyclohexylamine, n-butylamine and 2-ethylhexylamine are the most preferred.

Reactant (c) consists of polymerised, preferably dimerised or trimerised, fatty acids which are obtained in a known manner by polymerising monomeric, unsaturated fatty acids having 16 to 22, especially 16 to 18, carbon atoms. Particularly suitable fatty acids to use as starting materials are those which contain at least one, preferably 2 to 5, and especially 2 or 3, ethylenically unsaturated bonds, such as hexadecenoic acid, oleic acid, elaidic acid, hiragonic acid, licanic acid, eleostearic acid, arachidonic acid, clupanodonic acid and especially linoleic acid and linolenic acid. These fatty acids or their mixtures can be obtained from natural oils and fats, in which they are in particular present as glycerides. Technical mixtures of dimerised to trimerised fatty acids of the stated type, which always contain a small amount of monomeric acids, are preferred. Technical mixtures of dimerised to trimerised linoleic or linolenic acids, which as a rule contain 75 to 95 percent by weight of dimerised acids, 4 to 25 percent by weight of trimerised acids and up to about 3 percent by weight of monomeric acids and in general contain 2.5 to 4.0 acid group equivalents per kg are the most preferred.

The optional difunctional reactant (d) contains, for example, vinyl groups or carboxylic acid ester groups or alkyl-bonded halogen atoms, ie. halogenoalkyl groups, as the functional groups. Alternatively, the functional groups present can be at most one epoxide, nitrile, carboxylic acid or hydroxyl group together with one other functional group of the type mentioned above. In particular, the reactants (d) are difunctional organic compounds which contain chloroalkyl, bromoalkyl, vinyl or carboxylic acid alkyl ester groups as functional groups, or contain at most one nitrile, epoxide or carboxylic acid group together with one other functional group of the stated type. Aliphatic difunctional organic compounds are particularly suitable. These may be, for example, epihalogenohydrins, such as epibromohydrin or especially epichlorohydrin. Other examples of suitable difunctional compounds are glycerine dichlorohydrin, acrylic acid, methylolacrylamide and acrylonitrile. Epihalogenohydrins, preferably epichlorohydrin, acrylic acid and especially acrylonitrile are the most preferred.

In their preferred embodiment, the mixtures according to the invention contain 1 epoxy group equivalent of reactant (a), 0.4 to 0.5 mol of reactant (b), 0.4 to 0.6 acid group equivalent of reactant (c) and 0 to 0.5, preferably 0.1 to 0.5, mol of the optional reactant (d).

The aminoplast precondensates which serve as component (2) of the mixture are advantageously completely etherified, or more particularly partially etherified, methylol compounds of nitrogen-containing aminoplast-forming compounds, such as urea, thiourea or urea derivatives, for example ethyleneurea, propyleneurea or glyoxalmonourein. Preferably, however, etherified methylolaminotriazines are employed, for example alkyl ethers of highly methylolated melamine, the alkyl radicals having 1 to 6, preferably 1 to 4, carbon atoms. Suitable alkyl radicals are, inter alia, methyl, ethyl, n-propyl, isopropyl, n-butyl and also n-hexyl. In addition to such alkyl radicals, other radicals, for example polyglycol radicals, can also be present in the molecule. n-Butyl ethers of a highly methylolated melamine, containing 2 or 3 n-butyl groups in the molecule, are also preferred. In the present context, highly methylolated melamines means those which on average have not less than 5, for example 5 to 6, preferably about 5.5, methylol groups and which, for simplicity, are referred to as hexamethylolmelamine. Alkyl ethers of methylolated urea, of the methylolated urea derivatives mentioned, or, especially, of methylolated aminotriazines are preferred. The hexamethylolmelamine ethers referred to, especially hexamethylolmelamine di-n-butyl ether and tri-n-butyl ether, are the most preferred.

The reaction products (1) and the component (2) are preferably mixed so as to give preferred mixtures according to the invention which contain 90 to 60 per cent by weight of (1) and 10 to 40 percent by weight of (2), the sum of (1) and (2) being 100 percent by weight in each case.

To prepare the mixtures according to the invention, the reactants (a), (b) and (c) are reacted by methods known per se, preferably simultaneously, followed, where relevant, by reaction with component (d), to give the reaction product (1), after which the said product is mixed with component (2). Preferably, the reactants (a), (b), (c) and optionally (d), and the component (2) are employed in the ratios mentioned above, and preferably the reaction of components (a), (b), (c) and, optionally (d), is followed by mixing with component (2) without isolating the reaction product (1).

Preferably, the reaction of components (a), (b), (c) and optionally (d) is carried out at an elevated temperature, for example 80° to 120° C., especially at about 100° C. On the other hand, the mixing of the reaction product (1) with component (2) is always carried out at temperatures of at most 40° C., and preferably at room temperature (15°-30° C.).

Both the reactions of the components (a), (b), (c) and optionally (d), and the mixing of the reaction product (1) with component (2) are preferably carried out in the presence of an organic solvent. For the reaction of the components (a), (b), (c) and optionally (d), water-insoluble solvents having a high solvent power for the lipophilic reactants employed are generally used; the solvents are inert, ie. they do not react with the components mentioned. Suitable solvents are, inter alia, liquid aliphatic carboxylic acid esters whose boiling point is preferably above the reaction temperature, ie. above 80°-120° C., especially alkyl esters of monocarboxylic acids having a total of 5 to 8 carbon atoms. Examples of such esters include, inter alia, n-butyl acetate. If the reactants (a), (b), (c) and optionally (d) do not have a very pronounced lipophilic character, it suffices to employ water-soluble inert organic solvents, and in particular advantageously those miscible with water in all proportions. They include, in particular, alkanols and alkanediols or their ethers, as well as low molecular weight amides. Specific examples of such solvents are dioxane, isopropanol, ethylene glycol n-butyl ether (also referred to as n-butylglycol), diethylene glycol monobutyl ether and dimethylformamide. The mixing of the reaction products (1) with the components (2) is as a rule carried out in the presence of the solvents mentioned above, since the reaction products (1) are preferably not isolated. However, when carrying out the mixing it can also be advantageous to add, to the abovementioned solvents, hydrocarbons such as petrol, benzene, toluene or xylene and especially halogenated hydrocarbons, such as methylene bromide, carbon tetrachloride, ethylene chloride, ethylene bromide, s-tetrachloroethane and in particular also trichloroethylene and perchloroethylene.

As a rule, the compositions are applied to leather from an aqueous medium in which the reaction products are present in an emulsified form. Application from organic solutions is also possible. Where application is effected using the preferred aqueous medium, the mixtures according to the invention are, for this purpose, mixed with wetting agents and dispersants and with water, to give stable aqueous emulsions which have a pH value of about 4 to 8, preferably 4 to 6. The content of active substance, ie. the content of reaction products (1) and components (2), expressed as solids, is about 10 to 40 percent by weight. Examples of suitable wetting agents and dispersants are adducts of an alkylene oxide, preferably ethylene oxide, and relatively high molecular weight aliphatic or cycloaliphatic amines and alcohols, fatty acids or fatty amides, which adducts can optionally also be esterified at the hydroxyl groups by polybasic inorganic or organic acids. Furthermore, these compounds can also be reacted with other components in order, for example, to achieve a crosslinking effect. Oxyethylated alcohols derived from resin acids, treated, for example, with hexamethylene diisocyanate, are particularly suitable dispersants.

The application liquors can, in addition to the emulsified reaction products or mixtures of reaction products and aminoplast precondensates, also contain other additives such as acids, acid esters or salts as crosslinking catalysts, or other dressings or finishes, that is to say leather auxiliaries, such as wax emulsions or dulling agents. Examples of suitable acids are phosphoric acid, sulfuric acid and hydrochloric acid. Phosphoric acid and its monoalkyl esters having 1 to 4 carbon atoms are particularly suitable crosslinking catalysts; the monalkyl esters always contain a small concentration of the corresponding dialkyl esters.

The amount of active substance in the mixtures according to the invention (excluding solvent and water) applied when dressing leather is advantageously 1 to 10 $g/m^2$ of substrate. As a rule, the composition is applied at 20° to 100° C., preferably at room temperature.

Application is effected in accordance with known methods, for example by dipping, brushing, padding or impregnating or, preferably, by spraying.

The leather treated in this way is then dried, for example at temperatures of 30° to 80° C., preferably at 50° to 60° C. In general, the drying process requires about 30 to 120 minutes.

After drying, the leather is optionally subjected to a heat after-treatment at 90° (100) to 150° C., preferably at 100° to 120° C., advantageously under pressure, for example 50 (80) to 120 bar. This optional after-treatment is effected, for example, by calendering or by pressing between two heated metal plates or, in particular, by ironing.

The leather to be finished can be of any desired origin, and preferably so-called grain leather is used, ie. leather which is to be dressed on the grain side. The leather dressing can advantageously be effected in two stages, for example by applying the preparation according to the invention together with a dye or pigment suitable for leather colouring, drying this coating and then applying a colourless preparation which, for example, imparts additional gloss to the coloured layer.

The leather provided with such finishes exhibits very good general fastness characteristics. In particular it has very good light fastness and wet rub and dry rub fastness, as well as fastness to hot ironing and to creasing. The alcohol rub fastness is also particularly good. Furthermore, the handle shows a marked improvement, ie. the dressed leather has a desirable dry handle. The leather dressed according to the invention can accordingly be described as easy-care; taking an overall view of the fastness characteristics, it is superior to leather finished with polyurethanes or polyacrylates. Furthermore, the leather finish obtained can have antimicrobial and fungicidal properties, good microbicidal or fungicidal effects being achieved in respect of gram-positive and gram-negative bacteria, for example in respect of *Staphylococcus aureus, Escherícha coli* and *Proteus vulgaris,* and in respect of fungi, for example *Trichophyton mentagrophytes.*

Furthermore, the resulting stackability of leather finished according to the invention is an advantage. The high gloss and easy polishability of the dressed leather are particularly advantageous. Because of the large number of the resulting good properties mentioned above, the dressed leather according to the invention is particularly suitable for use in the shoe industry.

A further advantage of the mixtures according to the invention is that they are readily obtainable, because of the nature of the starting materials; further advantages are that they are easy to prepare and have good compatibility with many auxiliaries used in the leather industry. The versatile, that is to say universal, applicability of the mixtures according to the invention to a large number of types of leather is to be regarded as a further advantage.

In the Examples which follow, parts and percentages are by weight.

EXAMPLE 1

87.7 parts of an epoxide obtained from 2,2-bis-(4'-hydroxyphenyl)-propane and epichlorohydrin (0.05 epoxy group equivalent, the epoxide containing 0.57 epoxy group equivalent/kg) are dissolved in 27.5 parts of n-butyl acetate and 5 parts of n-butanol. 1.8 parts of n-butylamine (0.025 mol) and 7.25 parts of a technical mixture of about 75% of $C_{36}$ dimerised acid and about 25% of $C_{54}$ trimerised acid, based on linoleic and linolenic acid (0.025 acid equivalent, the mixture containing 3.45 acid equivalents/kg) are added to this solution. The reaction mixture is heated to 100° C. and is kept at this temperature for 3 hours. After this time, 1.35 parts of acrylonitrile (0.025 mol) are added to the reaction mixture, after which the batch is kept at 100° C. for a further 30 minutes.

Diluting the reaction mixture with 65.5 parts of perchloroethylene and 49 parts of butyl glycol gives a clear, viscous solution containing 40% of the reaction product and having an acid number of 8.

180 parts of the solution of the reaction product ar then mixed with 14.4 parts of a 70% solution of hexamethylolmelamine di-n-butyl ether and tri-n-butyl-ether in n-butanol, at room temperature. In order to convert the mixture obtained into a leather finish, 34 parts of a 50% aqueous solution of a reaction product of 1 mol of hydroabietyl alcohol and 200 mols of ethylene oxide, crosslinked with 1% of hexamethylene diisocyanate, and 99.6 parts of water are added, using an emulsifying apparatus. A fine, storage-stable oil-in-water emulsion, which contains 25% of active substance and is dilutable with water in all proportions, is obtained.

EXAMPLE 2

The reaction of the epoxide, the amine, the acid mixture and the acrylonitrile is carried out as stated in Example 1, but instead of 1.8 parts of n-butylamine, 3.2 parts of 2-ethylhexylamine (0.025 mol) are employed.

Dilution of the reaction mixture with 66.8 parts of perchloroethylene and 49.75 parts of butyl glycolate gives a clear, viscous solution containing 40% of the reaction product and having an acid number of 6. The solution of the reaction product is then mixed with the methylolated melamine ether as stated in Example 1, the emulsifier and water are added to the mixture obtained, and the batch is emulsified, once again giving a fine, storage-stable oil-in-water emulsion which contains 25% of active substance and is miscible with water in all proportions.

EXAMPLE 3

98.7 parts of an epoxide obtained from 2,2-bis-(4'-hydroxyphenyl)-propane and epichlorohydrin (0.1 epoxy group equivalent, the epoxide containing 1.01 epoxy group equivalents/kg) are dissolved in 39.4 parts of ethylene glycol mono-n-butyl ether. 5 parts of cyclohexylamine (0.05 mol) and 14.5 parts of a technical mixture of about 75% of $C_{36}$ dimerised acid and about 25% of $C_{54}$ trimerised acid based on linoleic acid and linolenic acid are added (0.05 acid equivalent, the mixture containing 3.45 acid equivalents/kg). The reaction mixture is heated to 100° C. and kept at this temperature for 3 hours.

The mixture is then diluted with 78.8 parts of perchloloethylene. A clear, viscous solution containing 50% of the reaction product and having an acid number of 12 is obtained.

90 parts of this solution of the reaction product are then mixed with 7.2 parts of a 70% solution of hexamethylolmelamine di-n-butyl ether and tri-n-butyl ether in n-butanol, at room temperature. To convert the mixture obtained to a leather dressing, 17 parts of a 50% aqueous solution of a reaction product of 1 mol of hydroabietyl alcohol and 200 mols of ethylene oxide, crosslinked with 1% of hexamethylene diisocyanate, and 52.4 parts of water are added, using an emulsifying apparatus. A fine, storage-stable oil-in-water emulsion which contains 30% of active substance and is miscible with water in all proportions is obtained.

EXAMPLE 4

98.7 parts of an epoxide obtained from 2,2-bis-(4'-hydroxyphenyl)-propane and epichlorohydrin (0.1 epoxy group equivalent) are dissolved in 40 parts of ethylene glycol monobutyl ether. 6.5 parts of n-octylamine (0.05 mol) and 14.5 parts of a technical mixture of about 75% of $C_{36}$ dimerised acid and about 25% of $C_{54}$ trimerised acid based on linoleic acid and linolenic acid (0.05 acid equivalent) are added to this solution.

The reaction mixture is heated to 100° C. and kept at this temperature for 3 hours. 2.7 parts of acrylonitrile (0.05 mol) are then added, after which the batch is kept at 100° C. for a further 3 hours.

Diluting the reaction mixture with 82.4 parts of perchloroethylene gives a clear, viscous resin solution, which has a solids content of 50% and an acid number of 18.

90 parts of the solution of the reaction product are then mixed with 7.2 parts of a 70% solution of hexamethylolmelamine dibutyl ether and tributyl ether in n-butanol, at room temperature. 17 parts of a 50% aqueous solution of a reaction product of hydroabietyl alcohol and 200 mols of ethylene oxide, crosslinked with 1% of hexamethylene diisocyanate, are then added and the mixture is emulsified, using an emulsifying apparatus, whilst slowly adding 52.4 parts of water. A fine, storage-stable oil-in-water emulsion, which contains 30% of active substance and is miscible with water in all proportions, is obtained.

EXAMPLE 5

87.7 parts of an epoxide obtained from 2,2-bis-(4'-hydroxyphenyl)-propane and epichlorohydrin (0.05 epoxy group equivalent, the epoxide containing 0.57 epoxy group equivalent/kg) are dissolved in 27.5 parts of butyl acetate and 5 parts of n-butanol. 2.3 parts of aniline (0.025 mol) and 7.25 parts of a technical mixture of about 75% of $C_{36}$ dimerised acid and about 25% of $C_{54}$ trimerised acid, based on linoleic acid and linolenic acid (0.025 acid equivalent, the mixture containing 3.45 acid equivalents/kg) are added to this solution. The reaction mixture is heated to 100° C. and kept at this temperature for 3 hours. Dilution with 65.5 parts of perchloroethylene and 47.8 parts of butyl glycolate gives a clear, viscous solution of the reaction product, the solution having a solids content of 40% and an acid number of 17.

180 parts of the solution of the reaction product are then mixed with 14.4 parts of a 70% solution of hexamethylolmelamine dibutyl ether and tributyl ether in n-butanol at room temperature. 34 parts of a 50% aqueous solution of a reaction product of 1 mol of hydroabietyl alcohol and 200 mols of ethylene oxide, crosslinked with 1% of hexamethylene diisocyanate, are then added, and the mixture is emulsified, using an emulsifying apparatus, whilst slowly adding 99.6 parts of water. A fine, storage-stable oil-in-water emulsion is obtained, which contains 25% of active substance and is miscible with water in all proportions.

EXAMPLE 6

98.7 parts of an epoxide obtained from 2,2-bis-(4'-hydroxyphenyl)-propane and epichlorohydrin (0.1 epoxy group equivalent, the epoxide containing 1.01 epoxy group equivalents/kg) are dissolved in 39 parts of ethylene glycol monobutyl ether. 3.75 parts of 3-amino-propanol (0.05 mol) and 14.5 parts of a technical mixture of about 80% of $C_{36}$ dimerised acid and about 20% of $C_{54}$ trimerised acid, based on linoleic acid and linolenic acid (0.05 acid equivalent, the mixture containing 3.45 acid equivalents/kg) are added to this solution. The reaction mixture is heated to 120° C. and kept at this temperature for 7 hours. Diluting the reaction mixture with 77.7 parts of cyclohexanone gives a clear, viscous resin solution, which has a solids content of 50% and an acid number of 12.

61.5 parts of the solution of the reaction product are mixed with 27.7 parts of a 70% solution of hexamethylolmelamine dibutyl ether and tributyl ether in n-butanol, 10 parts of a block copolymer of polypropylene glycol and ethylene oxide (molecular weight 14,000) and 10 parts of water. The mixture is emulsified, using an emulsifying apparatus, whilst slowly adding 90.8 parts of water. A fine, storage-stable oil-in-water emulsion, which contains 25% of active substance and is miscible with water in all proportions, is obtained.

EXAMPLE 7

112.5 parts of an epoxide obtained from 2,2-bis-(4'-hydroxyphenyl)-propane and epichlorohydrin (0.25 epoxy group equivalent, the epoxide containing 2.2 epoxy group equivalents/kg) are dissolved in 41.7 parts of ethylene glycol monobutyl ether.

7.3 parts of n-butylamine (0.1 mol) and 28.3 parts of a technical mixture of about 80% of $C_{36}$ dimerised acid and about 20% of $C_{54}$ trimerised acid based on linoleic acid and linolenic acid (0.1 acid equivalent, the mixture containing 3.53 acid equivalents/kg) are added to the above solution. The reaction mixture is stirred for 1½ hours at 100° C. 3.4 parts of epichlorohydrin (0.06 mol) are then added and the mixture is stirred for 30 minutes at 100° C. internal temperature. Dilution of the reaction mixture with 185.4 parts of perchloroethylene gives a clear, viscous resin solution having a solids content of 40% and an acid number of 18.

225 parts of the solution of the reaction product are mixed with 86.3 parts of a 70% solution of hexamethylolmelamine dibutyl ether and tributyl ether in n-butanol, at room temperature. 60 parts of a 50% aqueous solution of a reaction product of 1 mol of hydroabietyl alcohol and 200 mols of ethylene oxide, crosslinked with 1% of hexamethylene diisocyanate, are then added and the mixture is emulsified, using an emulsifying apparatus, whilst slowly adding 128.7 parts of water. A fine, storage-stable oil-in-water emulsion, which contains 30% of active substance and is miscible with water in all proportions, is obtained.

EXAMPLE 8

153.6 parts of an epoxide obtained from 2,2-bis-(4'-hydroxyphenyl)-propane and epichlorohydrin (0.24 epoxy group equivalent, the epoxide containing 1.56 epoxy group equivalents/kg) are dissolved in 62.5 parts of ethylene glycol monobutyl ether. 34 parts of a technical mixture of about 80% of $C_{36}$ dimerised acid and about 20% of $C_{54}$ trimerised acid, based on linoleic acid and linolenic acid (0.12 acid equivalent, the mixture containing 3.53 acid equivalents/kg) are then added, after which a solution of 5.4 parts of ethylamine (0.12 mol) in 17.5 parts of ethanol is introduced dropwise, in the course of 15 minutes, into the reaction mixture, the reaction temperature being 80° C.

The reaction mixture is then kept at 80° C. for 3 hours. Thereafter, 1.7 parts of acrylic acid (0.024 mol) are added and the temperature is kept at 80° C. for a further 30 minutes. Dilution of the reaction mixture with 113.3 parts of perchloroethylene gives a clear, viscous resin solution, having a solids content of 50% and an acid number of 15.

194 parts of the solution of the reaction product are mixed with 93 parts of a 70% solution of hexamethylolmelamine dibutyl ether and tributyl ether in n-butanol, 32.35 parts of a block copolymer of polypropylene glycol and ethylene oxide (molecular weight 14,000) and 20 parts of water. The mixture is emulsified, using an emulsifying apparatus, whilst slowly adding 199.65 parts of water. A fine, storage-stable oil-in-water emulsion, which contains 30% of active substance and is miscible with water in all proportions, is obtained.

EXAMPLE 9

30 parts of a pigment dispersion which contains 20% of the pigment C.I. 74160 (Pigment Blue 15) are mixed with 300 parts of the emulsion according to Example 1 and 10 parts of phosphoric acid, and the mixture is then diluted with water to 1,000 parts. The mixture thus obtained is sprayed three times, crosswise, on Nappa leather which has been dyed blue, 1 minute's intermediate drying, at 60° C., being allowed between coats.

The leather is then sprayed twice, crosswise, with a colourless gloss solution, prepared from 300 parts of the emulsion according to Example 1, 10 parts of phosphoric acid and 690 parts of water, at 25° to 30° C. Thereafter, the leather is dried for 2 hours at 60° C. and ironed at 100° C./100 bar.

The leather pigmented in this way exhibits very good dry rub fastness and wet rub fastness. Its alcohol rub fastness is also very good. The finish is crack-resistant and dry to the touch.

Similar results are obtained with the emulsions according to Examples 2 to 8.

What is claimed is:

1. A mixture of a reaction product (1) and an aminoplast precondensate (2), which mixture contains (1) a reaction product obtained from the following reactants: (a) an epoxide having at least two epoxy groups per molecule, (b) a primary amine having 2 to 8 carbon atoms and (c) a polymerised fatty acid which is derived from monomeric, unsaturated fatty acids having 16 to 22 carbon atoms, and (2) as the second component of the mixture, an aminoplast precondensate etherified by alkyl having 1 to 6 carbon atoms.

2. A mixture according to claim 1, wherein the reactant (a) is a polyglycidyl ether of 2,2-bis-(4'-hydroxyphenyl)-propane.

3. A mixture according to claim 2, wherein the reactant (a) is a reaction product of epichlorohydrin and 2,2-bis-(4'-hydroxyphenyl)-propane.

4. A mixture according to claim 3, wherein the reactant (a) contains 0.3 to 2.2 epoxy group equivalents per kg.

5. A mixture according to claim 1, wherein the reactant (b) is a primary cycloalkylamine or alkylamine having 2 to 8 carbon atoms.

6. A mixture according to claim 1, wherein the reactant (c) is a dimerised or trimerised fatty acid which is derived from a monomeric, unsaturated fatty acid having 16 to 18 carbon atoms.

7. A mixture according to claim 6, wherein the reactant (c) contains 2.5 to 4.0 acid group equivalents per kg.

8. A mixture according to claim 1, wherein the reactant (d) is a difunctional compound which contains, as functional groups, at least one halogenoalkyl, vinyl or carboxylic acid ester group, and optionally at most one epoxide, carboxylic acid, hydroxyl or nitrile group.

9. A mixture according to claim 8, wherein the optional reactant (d) is epichlorohydrin, acrylic acid or acrylonitrile.

10. A mixture according to claim 1, wherein the reaction product (1) has been obtained from 1 epoxy group equivalent of reactant (a), 0.4 to 0.5 mol of reactant (b), 0.4 to 0.6 acid group equivalent of reactant (c) and up to 0.5 mol of reactant (d).

11. A mixture according to claim 10, wherein a reaction product (1) has been obtained from reactants (a), (b) and (c) and 0.1 to 0.5 mol of reactant (d).

12. A mixture according to claim 1, wherein component (2) is an etherified and methylolated urea or urea derivative or a methylolated and etherified aminotriazine.

13. A mixture according to claim 12, wherein component (2) is a highly methylolated melamine etherified with alkyl having 1 to 4 carbon atoms.

14. A mixture according to claim 1, which contains 90 to 60 percent by weight of reaction product (1) and 10 to 40 percent by weight of component (2).

15. A process for the preparation of a mixture according to claim 1, which comprises reacting the reactants (a), (b) and (c) simultaneously with one another, to give the reaction product (1), and subsequently mixing the latter with component (2).

16. A process according to claim 15, wherein the reaction of the reactants (a), (b) and (c) is carried out at 80° to 120° C.

17. A process as claimed in claim 15, wherein the reaction of the reactants (a), (b) and (c) and the mixing of the reaction product (1) with the component (2) are carried out in the presence of an inert organic solvent.

18. A process for finishing leather, which comprises applying an organic-aqueous preparation, which contains a mixture according to claim 1, to leather and then drying the leather at an elevated temperature and subjecting it to a heat after-treatment under pressure.

19. A process according to claim 18, wherein the preparation is applied to the leather by spraying at room temperature.

20. A process according to claim 18, wherein the leather is dried at 30° to 80° C.

21. A process according to claim 18, wherein the leather is subjected to a heat after-treatment by ironing at 90° to 150° C. and 50 to 120 bar.

22. An aqueous-organic preparation for carrying out the process according to claim 18, which contains a mixture of claim 1, an emulsifier, a cross-linking catalyst, a leather pigment and a leather auxiliary.

23. A preparation according to claim 22, which is in the form of an oil-in-water emulsion.

24. A preparation according to claim 22, which contains phosphoric acid, or a monoalkyl ester thereof, alkyl having 1 to 4 carbon atoms, as a cross-linking catalyst.

25. The leather finished by the process according to claim 19.

26. A mixture of claim 1, wherein reaction product (1) is formed from reactants (a), (b) and (c) plus (d) which is a difunctional compound which differs from the reactants (a) and (c).

27. A process of claim 15, wherein the reaction product of reactants (a), (b) and (c) is subsequently reacted with reactant (d) which is a difunctional compound which differs from the reactants (a) and (c).

* * * * *